(12) United States Patent
Otsuka et al.

(10) Patent No.: US 6,666,002 B1
(45) Date of Patent: Dec. 23, 2003

(54) FILLING MACHINE PROVIDED WITH FLUSHING DEVICE

(75) Inventors: Yuzo Otsuka, Tokyo (JP); Kazuya Ono, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 10/019,681

(22) PCT Filed: Jul. 6, 2002

(86) PCT No.: PCT/US00/40302

§ 371 (c)(1),
(2), (4) Date: Apr. 22, 2002

(87) PCT Pub. No.: WO01/02249

PCT Pub. Date: Jan. 11, 2001

(30) Foreign Application Priority Data

Jul. 7, 1999 (JP) .............................. 11-193195

(51) Int. Cl.[7] .............................. B65B 9/20; B65B 55/10
(52) U.S. Cl. .............................. 53/426; 53/167; 53/551
(58) Field of Search .............................. 53/426, 451, 551, 53/552, 167

(56) References Cited

U.S. PATENT DOCUMENTS

| | | |
|---|---|---|
| 3,164,936 A | 1/1965 | Löliger |
| 3,854,874 A | 12/1974 | Loliger et al. |
| 3,911,642 A | 10/1975 | Ernstsson et al. |
| 4,225,556 A | 9/1980 | Löthman et al. |
| 5,173,259 A | 12/1992 | Bordini |
| 5,489,783 A | 2/1996 | Kristiansson |

FOREIGN PATENT DOCUMENTS

| | | |
|---|---|---|
| CA | 603718 | 6/1960 |
| WO | WO 98/09870 A1 | 3/1998 |

*Primary Examiner*—John Sipos
(74) *Attorney, Agent, or Firm*—Burns, Doane, Swecker & Mathis, LLP

(57) ABSTRACT

A filling machine for producing containers containing liquid food product includes a series of rollers for forming a web-shaped packaging material into a tubular packaging material, a filling tube for introducing a liquid food product into the tubular packaging material while the tubular packaging material is being conveyed downwardly, a heat sealing bar providing with a heating mechanism and engageable with a cutting bar to produce a seal area forming a transverse seal across the tubular packaging material below a level of the liquid food product, and a cutter provided on the cutting bar to cut the tubular packaging material in the seal zone to form a preformed container containing the liquid food product. At least one nozzle is positioned to direct a sterilizing flushing liquid towards the outside surface of the tubular packaging material and/or the cutter. The flushing liquid advantageously cleans and sterilizes the outer surface of the tubular packaging material, and is able to flow downwardly to wash and sterilize the sealing bar and the cutter. Also, the flushing liquid can cool the packaging material after the formation of the transverse seal and so the plastic or resin material of the packaging material is relatively rapidly hardened. It is thus less likely that the plastic or resin material will be stained or soiled. As a result, the appearance of the packaging material is improved.

17 Claims, 2 Drawing Sheets

FILLING MACHINE PROVIDED WITH FLUSHING DEVICE

FIELD OF THE INVENTION

Figure 1:
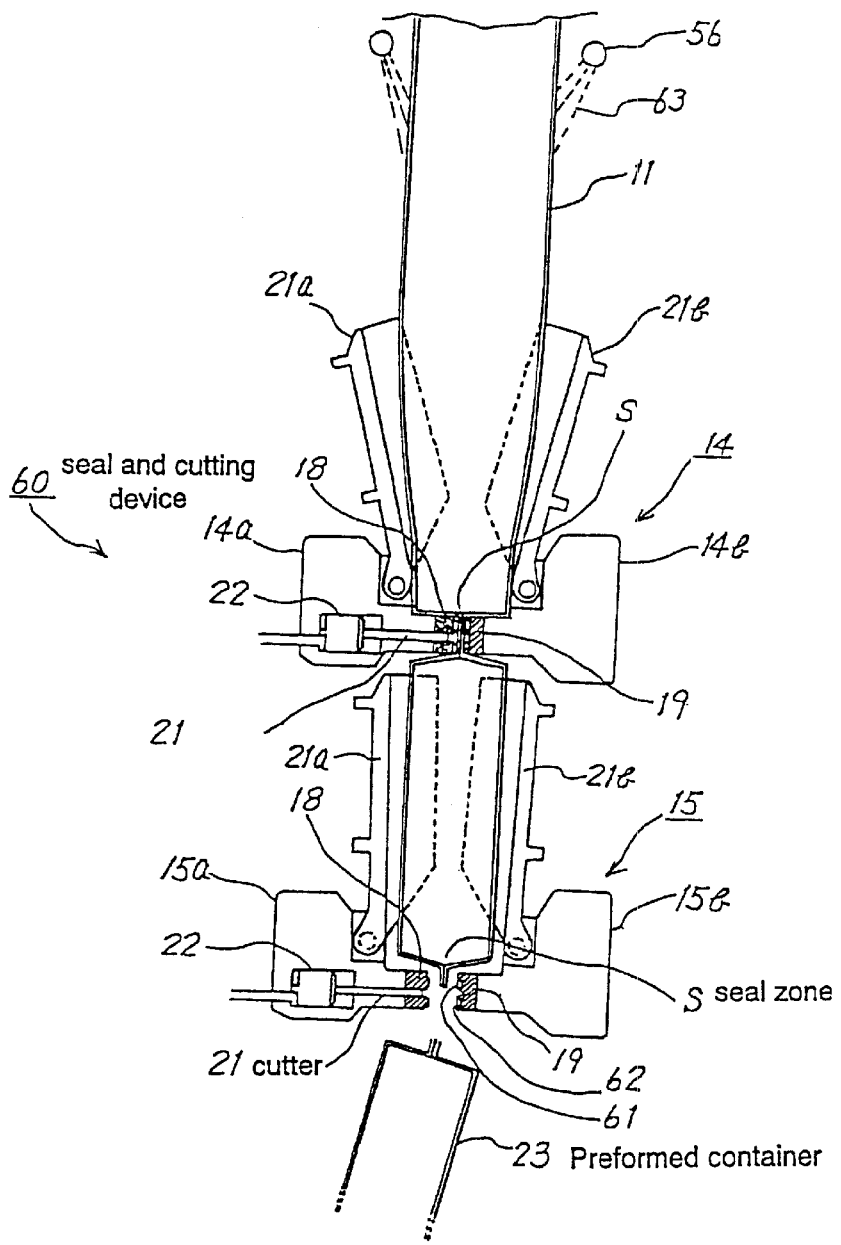

The present invention generally relates to a filling machine for filling containers with contents. More particularly, the present invention pertains to a flushing device of a filling machine for filling containers with liquid food products.

BACKGROUND OF THE INVENTION

One version of a packaging filling machine which fills liquid food products, such as milk and juice, into a container to produce a filled packaging container involves using a web-shaped packaging material on a reel. The web-shaped packaging material on the reel is charged to a charging station of the filling machine and is then let out from the charging station and conveyed to the filling machine.

The packaging material consists of a flexible laminate, which can include a paper substrate and plastic layers of polyethylene laminated on both sides of the paper substrate. If necessary, a barrier layer, that can include aluminum foil and a resin having gas barrier properties, is formed between the paper substrate and the plastic layers.

Upon being let out from the charging station, the packaging material is longitudinally sealed in the lengthwise direction and formed into a tubular shape. The tubular packaging material is then transversely pressed from opposite sides by a seal and cutting mechanism. This seal and cutting mechanism can include an induction heater as the seal device and a cutter as the cutting device. The packaging material is sealed in the transverse direction at successive fixed intervals by the seal device. At this time, a pair of forming flaps surrounds and presses the tubular packaging material from the outside, and transforms the packaging material into a pillow-shape.

At once, using the cutting device, the pillow-shaped packaging material is cut along the centerline of the transverse seal produced by the seal device. As a result, plural pillow-shaped preformed containers containing a liquid food product are formed, with the preformed containers then being formed into a brick-shaped packaging container through operation of a final folder.

In connection with the transverse sealing mentioned above, liquid food is filled into the tubular packaging material. In the position below the level of the filled liquid food product, the packaging material is pressed from both sides by the sealing device, is heated and is thus transverse-sealed.

Much of the liquid food product is squeezed out from the transverse seal zone. However, some of the liquid food may remain along the centerline in this transverse seal zone. Because the seal zone is cut with the cutting device, the cutting device tends to become stained or soiled by the liquid food product. The liquid food product can also stain or soil the cut portion of the packaging container. Published International Application No. WO98/09870 proposes a machine for cleaning the cutting device with cleaning water. In this machine, cleaning medium, for example water, is directly jetted out at the tip of the cutting device or the cutter knife.

In light of the foregoing, a need exists for avoiding the disadvantages and drawbacks discussed above.

A need thus exists for a way of cleaning the peripheral surface of the packaging material.

A need also exists for a way of cleaning the sealing device and the cutting device, while also sterilizing them.

It would be desirable to achieve the foregoing in a way that also imparts lubricity to the outside of the packaging material, thus facilitating smooth movement of the packaging material and improved packaging formation.

SUMMARY OF THE INVENTION

According to one aspect of the invention, a filling machine for producing containers containing liquid food product includes a series of rollers for forming a web-shaped packaging material into a tubular packaging material, a filling tube for introducing a liquid food product into the tubular packaging material while the tubular packaging material is being conveyed downwardly, a heat sealing bar providing with a heating mechanism and engageable with a cutting bar to produce a seal area forming a transverse seal across the tubular packaging material below a level of the liquid food product, and a cutter provided on the cutting bar to cut the tubular packaging material in the seal zone to form a preformed container containing the liquid food product. At least one nozzle is positioned to direct a sterilizing flushing liquid towards the outside surface of the tubular packaging material.

In accordance with another aspect of the invention, a filling machine for producing containers containing liquid food product includes a filling device for filling a liquid food product into a tubular packaging material conveyed downwardly from above, a sealing mechanism for sealing the tubular packaging material transversely under a liquid level of the liquid food product in the tubular packaging material to form a transverse seal zone, a cutting mechanism for cutting the seal zone to form a preformed container containing liquid food product, and a flushing liquid supplying arrangement for supplying a flushing liquid containing a disinfectant towards an outside surface of the packaging material.

According to another aspect of the invention, a method for producing containers containing liquid food product involves forming a web-shaped packaging material into a tubular packaging material, introducing a liquid food product into the tubular packaging material while the tubular packaging material is being conveyed downwardly, forming a transverse seal across the tubular packaging material containing the liquid food product, cutting the tubular packaging material in the transverse seal of the packaging material to form a filled preformed container, directing sterilizing flushing liquid towards the tubular packaging material while the tubular packaging material is being cut in the transverse seal of the packaging material.

By virtue of the present invention, the flushing liquid cleans and sterilizes the outer surface of the tubular packaging material, and is able to flow downwardly to wash and sterilize the sealing bar and the cutter. Also, the flushing liquid can cool the packaging material after the formation of the transverse seal and so the plastic or resin material of the packaging material is relatively rapidly hardened. It is thus less likely that the plastic or resin material will be stained or soiled. As a result, the appearance of the packaging material is improved.

BRIEF DESCRIPTION OF THE DRAWING FIGURES

Figure 2:
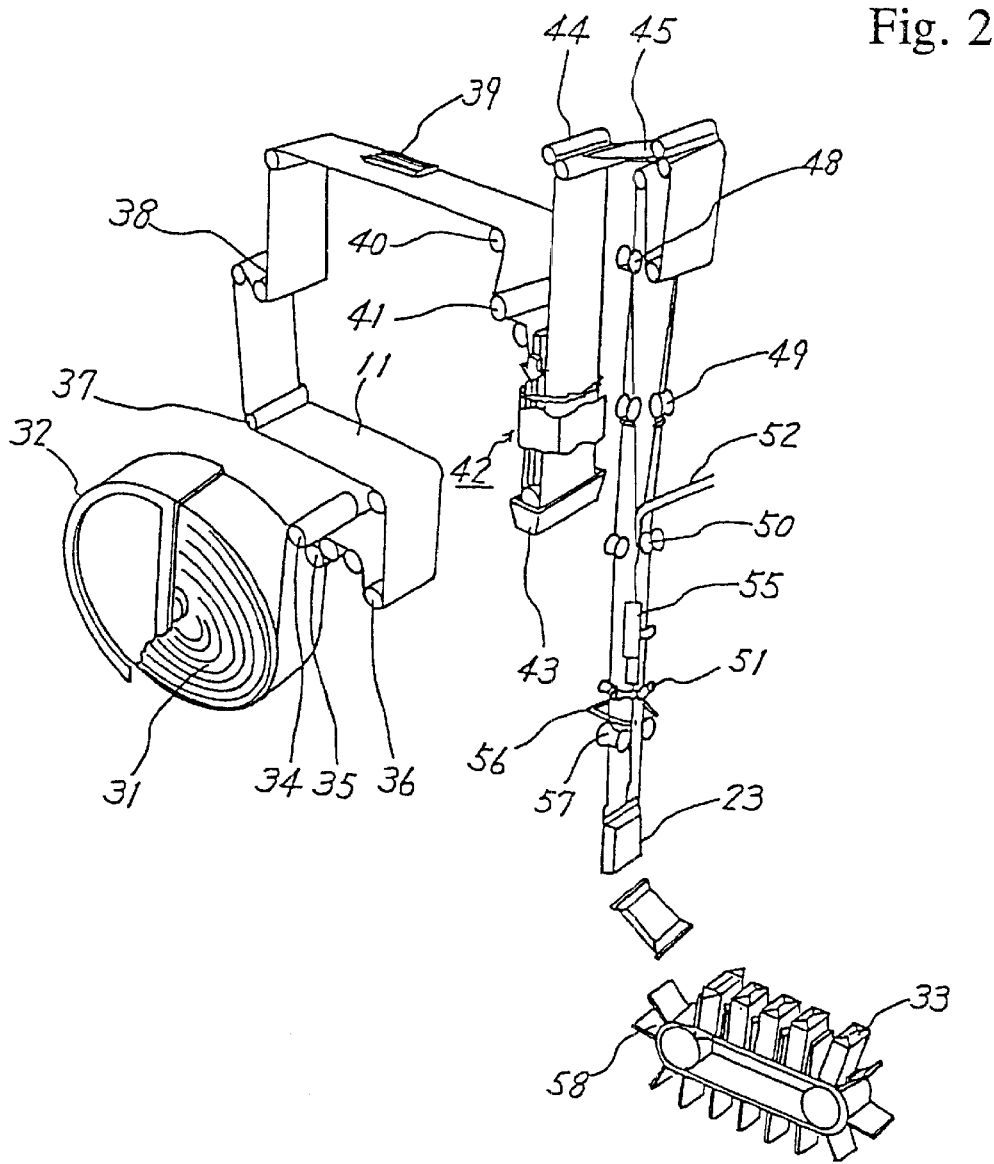

The foregoing and additional features of the present invention will become more apparent from the following detailed, description considered with reference to the accompanying drawing figures in which like elements are designated by like reference numerals and wherein:

FIG. 1 is a schematic illustration of the sealing and cutting device forming a part of the filling machine of the present invention and illustrating the flushing nozzle according to the present invention; and FIG. 2 is a schematic illustration of the filling machine in which is employed the sealing and cutting device and flushing nozzle shown in FIG. 1.

DETAILED DESCRIPTION OF THE PREFERRED EMBODIMENT

Referring initially to FIG. 2, an embodiment of the filling machine with which the present invention is concerned involves the formation and filling of packages from a flat web-shaped packaging material 11. This web-shaped packaging material is housed in a cassette 32 in the form of a reel 31 and is charged or conveyed to the charging station of the filling machine through the cassette 32.

By way of example, the web of packaging material 11 can be in the form of a flexible paper laminate consisting of a paper substrate, and a heat-sealable/waterproof layer of polyethylene resin laminated on both sides of the paper substrate. If necessary, a barrier layer in the form of aluminum foil or a resin having gas barrier properties is formed between the paper substrate and one or both of the heat-sealable/waterproof layers. In addition, an exterior design forming the outward appearance of the packaging container 33 can be printed on the outer surface of the material.

The packaging material 11 unwound from the reel to the charging station is intermittently conveyed by rollers which serve as a conveying mechanism. The packaging material is forwarded to a printing unit 38 through a series of rollers, including a guide roller 34, a feed roller 35, a tension roller 36, and a bending roller 37. Information such as the tasting time limit or expiration date of the contents of the package container 33 is printed on an appropriate indication space of the package material 11 in the printing unit 38.

The packaging material 11 is conveyed to an applicator 39 which applies a continuous tape strip along the packaging material web. This tape strip is used later on to facilitate forming the packaging material into a tubular shape. The packaging material 11 with the applied tape strip is sent to a sterilizing bath 42 by way of several bending rollers 40, 41 and is sterilized by a sterilizing liquid, for example a hydrogen peroxide aqueous solution, at the sterilizing bath 42. The sterilizing bath 42 includes a bottom tray 43 containing sterilizing liquid through which the packaging material 11 is conveyed.

From the sterilizing bath 42, the packaging material 11 is forwarded upwardly through calendar rollers 45 and to an air knife 45. The air knife 45 strongly directs hot air of the packaging material 11 to dry the packaging material 11. After being dried by the air knife 45 and conveyed through several other rollers, the packaging material 11 is gradually transformed into a tubular shape by a series of forming rings. The series of forming rings includes above forming rings 48 constituting the uppermost rings, mobile forming rings 49 constituting the next rings through which the packaging material is conveyed, forming rings 50 constituting the rings through which the packaging material is conveyed after the mobile forming rings 49, and below forming rings 51 constituting the last rings. After passing through the forming rings and being formed into a tubular shape, the tubular shaped packaging material 11 is sealed in the longitudinal or lengthwise direction, using the previously applied tape strip, by a longitudinal sealing device 55. After formation of the packaging material into a tubular shape, liquid food product such as milk, juice or the like, which constitutes the contents, is introduced into the tubular shaped packaging container. The tubular shaped packaging material is filled with such contents through the use of a filling pipe 52 which extends down into the interior of the tubular shaped packaging material 11.

The packaging material 11, formed in a tubular shape and into which the liquid food product has been filled, is cleaned by a disinfectant containing flushing liquid which is jetted out from a flushing device in the form of one or more flushing nozzles 56. The flushing nozzle(s) 56 can form a part of a flushing liquid supplying mechanism. The flushing nozzle(s) 56 are directed at the outer surface of the tubular shaped packaging material in the manner shown in FIG. 1. The flushing liquid supplying mechanism can also include a source of flushing liquid connected to the flushing nozzle(s) 56. The flushing liquid is preferably in the form of a relatively cold sterilizing liquid containing a disinfectant or sterilizing ingredient. In this preferred embodiment, the flushing liquid is ozonized water.

After being cleaned by the flushing nozzle(s) 56, the filled tubular shaped packaging material 11, guided by tube supporting rings 57, is forwarded to a sealing and cutting device. Here, the filled tubular shaped packaging material is transverse-sealed at fixed intervals, corresponding to the dimension of the finished package, by the sealing device, and is then cut by the cutting device in the sealed area to form individual filled packages or containers. The packages or containers are also formed into pillow-shape preformed containers 23 as shown in FIG. 2. The preformed containers 23 are conveyed to a final folder 58 and are formed into brick shaped containers, thus producing liquid food filled packaging containers 33.

Further details concerning the flushing nozzle(s) 56 and the sealing and cutting device can be seen with reference to FIG. 1. As described above, the tubular packaging material 11 receives the liquid food product that is fed through the filling pipe 52 to thereby fill the tubular packaging material. The filled tubular packaging material 11 is continuously and intermittently conveyed in a downward direction and is forwarded to the sealing and cutting device 60.

The sealing and cutting device 60 is comprised of two sealing and cutting units 14, 15. Each sealing and cutting unit 14,15 includes a cutting jaw 14a, 15a, and a pressure jaw 14b, 15b. The sealing and cutting units also include a cutting bar 18 and a heat sealing bar 19. The cutting bar 18 is preferably provided on the cutting jaw 14a, 15a while the heat sealing bar 19 is preferably provided on the pressure jaw 14b, 15b. A cutting device in the form of a relatively thin cutter 21 is slidably mounted in a relatively narrow space in each cutting jaw 14a, 15a generally at the center of the cutting bar 18. The end of the cutting device 21 (i.e., the left end as seen with reference to FIG. 1) is connected to a cylinder 22 that functions as the cutting device driving mechanism. This driving mechanism 22 slidably moves the cutting device back and forth to effect cutting of the tubular packaging material.

A forming flap 21a is supported on each cutting jaw 14a, 15a. A forming flap 21b is also supported on each of the pressure jaws 14b, 15b. The forming flaps 21a, 21b are able to freely sway or move and surround the packaging material 11 in a known manner.

The tubular packaging material 11 is pressed from opposite sides by the sealing and cutting units 14, 15, and is transversely sealed to form respective seal zones S. Once the seal zone S is formed, the cutting device 22 is actuated to cut the sealed material in the area of the just formed seal to thereby result in an individual preformed container 23. The packaging material 11 is pressed from opposite sides by the relative movement towards one another of the cutting jaw 14a, 15a and the pressure jaw 14b, 15b.

The sealing bar 19 on the pressure jaw 14b, 15b is provided with inductors 61, 62 forming induction heaters. The induction heaters function as the sealing mechanism that forms the transverse seal (i.e., the seal zone S) in the packaging material when the pressure jaws 14b, 15b and the cutting jaws 14a, 15a are moved towards one another and press the packaging material.

The cutting device 21 moves in a sliding manner in the forward direction through operation of the cylinder 22. As the cutting device 21 slides forward, the cutting device 21 cuts the tubular packaging material 11 along the seal zone S. Also, the forming flaps 21a, 21b cover or surround the tubular packaging material 11, press against the packaging material, and transform and form the packaging material into the pillow shaped packages that ultimately result once the sealing and cutting is effected.

The operation of the sealing and cutting units 14, 15 is as follows. At the seal and cutting device 60 shown in FIG. 1, the sealing and cutting unit 14 is in the upper sealing and cutting starting position. In the sealing and cutting starting position, the cutting jaw 14a and the pressure jaw 14b are illustrated in the forward position (i.e., the cutting jaw 14a and the pressure jaw 14b have been moved towards one another). In this position, the cutting jaw 14a and the pressure jaw 14b press the tubular packaging material 11 from both sides. The sealing and cutting unit 14 moves down as it presses and holds the packaging material 11.

During this holding of the packaging material 11, the heat sealing bar 19 and the cutting bar 18 push the packaging material 11 rather strongly. The induction heaters 61, 62 in the sealing bar 19 heat the packaging material 11 to effect the transverse seals and form the seal zone S. As mentioned above, as the packaging material 11 is held by the sealing and cutting unit 14, while the transverse sealing is being accomplished, the seal and cutting unit 14 moves downward towards a lower sealing and cutting finishing position. Also, during movement of the sealing and cutting unit 14, the forming flaps 21a, 21b move in the closing direction towards one another in a known manner and surround the packaging material 11 to transform and form the packaging material into the pillow shaped configuration.

In FIG. 1, the seal and cutting unit 15 is illustrated in the lower sealing and cutting finishing position. Just before reaching the sealing and cutting finishing position, the cutting device 21 of the sealing and cutting unit 15 moves forward towards the sealing bar 19, cuts the packaging material in the center portion of the seal zone S and thus separates the preformed container 23 from the remainder of the tubular packaging material 11. The sealing and cutting unit 15 returns to the sealing and cutting starting position after the cutting of the packaging material at the center portion of the seal zone S is completed. While returning to the sealing and cutting starting position, the cutting jaw 15a and the pressure jaw 15b of the sealing and cutting unit 15 move away from each other, and turn over outside the sealing and cutting unit 14 to rise to the upper starting position.

Upstream of the sealing and cutting device 60, considered with reference to the conveying direction of the packaging material, the flushing device in the form of one or more nozzles 56 is positioned around the tubular packaging material 11 as shown in FIG. 1. The flushing device is connected to a source of ozonized water and the ozonized water 63 is jetted out against the outer surface of the packaging material 11 from the flushing nozzle(s) 56. The concentration of ozone in the ozonized water 63 is on the order of, for example, 0.01–20 (ppm), preferably on the order of about 0.1–10 (ppm).

The ozonized water 63 cleans the peripheral surface of the packaging material 11 and sterilizes it. In addition, the ozonized water flows downwardly to clean and sterilize the seal and cutting units 14, 15 during operation.

Because the packaging material as well as the overall sealing and cutting device are washed with the sterilizing/cleaning ozonized water while the cutting device 21 moves within the sealing and cutting units 14, 15 and through the packaging material, the ozonized water prevents the packaging material and the overall device from becoming polluted or contaminated by undesirable microorganisms and the like.

The ozonized water 63 also cools the seal zone S of the packaging material 11 that is heated and transverse sealed by the induction heaters 61, 62. This cooling causes a relatively rapid hardening of the fused plastic material (e.g., polyethylene resin) of the packaging material 11. Therefore, during the cutting of the seal zone S, an improvement in the detachment or separation of the plastic material (e.g., polyethylene resin) and the cutting device 21 can be realized.

The staining or soiling of the plastic or resin material can also be prevented and so the appearance of the packaging material 11, including the cut portion, is improved. Moreover, the ozonized water 63 imparts lubricity to the outside of the packaging material 11 and so the packaging material 11 is able to move more smoothly, thus improving the formation of the packaging material 11.

According to a preferred form of the present invention, the ozonized water 63 includes ozonized water made by an ultraviolet light irradiation method, a discharge method and an electrolyzed method, as well as ozonized water produced by a direct electrolyzed method.

In the electrolyzed direct method, brine water (alkaline water) is formed as a sub-product. However, it is possible to maintain the desired concentration of ozonized water 63 even if the brine water is included in the ozonized water 63.

Because only very little ozone gases are generated gradually from the ozonized water 63, the ozone gas does not dissolve into the liquid food product. Instead, the gas tends to rise and is then heated by the hot air discharged from the heating device or air knife located near the top of the filling machine, and is thus broken down.

The filling pipe 52, the longitudinal sealing device 55, the flushing nozzle 56, and other parts of the filling machine are in an aseptic environment so that the liquid food product is filled into the tubular packaging material under aseptic conditions in an aseptic chamber. To the extent ozone gas is generated, this ozone gas can contribute to maintaining this aseptic environment.

In this embodiment, the flushing liquid serves a sterilizing function and also functions to cool the seal zone S. Thus, according to a preferred form of the invention, the temperature of the flushing liquid (i.e., ozonized water) is selected to allow the flushing agent to perform both functions. The use of a flushing liquid, or ozonized water, at a temperature between 2° C.–20° C., preferably 5°–15° C., is well suited to achieving this objective. Flushing liquid at a temperature of about 10° C. is believed to be particularly useful in this regard.

In addition to directing the flushing liquid at the outer surface of the packaging material at a point upstream of the sealing and cutting device 60, another flushing device, for example in the form of one or more flushing nozzles, can be provided about the sealing and cutting unit to deliver a more direct jet of flushing liquid (e.g., ozonizd water) to the cutting device. In such a situation, the flushing liquid at the different locations can be optionally set to different temperatures.

It is to be recognized that although ozonized water has been described as the flushing liquid, other bactericide containing aqueous solutions can also be used as the flushing liquid.

It can be seen from the foregoing description that the present invention provides a variety of advantages. The flushing liquid advantageously cleans and sterilizes the peripheral surface of the packaging material. In addition, the flushing liquid flows downwardly and washes and sterilizes the sealing device and the cutting device. Thus, because the cleaning and sterilizing are performed even if the cutting device is housed or hidden in the sealing and cutting device, the flushing liquid prevents pollution or contamination by undesirable microorganisms and the like.

Also, because the packaging material after the formation of the transverse seal is cooled by the flushing liquid, the plastic or resin material of the packaging material is relatively rapidly hardened. Therefore, the staining or soiling of the plastic or resin material can be prevented during the cutting of the seal zone. As a result, the appearance of the packaging material is improved.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. A filling machine for producing containers containing liquid food product comprising:

a series of rollers for forming a web-shaped packaging material into a tubular packaging material, the tubular packaging material having an outside surface;

a filling tube for introducing a liquid food product into the tubular packaging material while the tubular packaging material is being conveyed downwardly, the tubular packaging material having an outside surface;

at least one forming flap engageable with the packaging material to transform and form the packaging material into a desired configuration;

a heat sealing bar providing with a heating mechanism and engageable with a cutting bar to produce a seal area forming a transverse seal across the tubular packaging material below a level of the liquid food product;

a cutter provided on the cutting bar to cut the tubular packaging material in the seal zone to form a preformed container containing the liquid food product; and at least one nozzle positioned above said at least one forming flap for directing a sterilizing flushing liquid to at least a portion of the outside surface of the tubular packaging material located above the transverse seal.

2. The filling machine as defined in claim 1, wherein said at least one nozzle is positioned upstream of the heat sealing bar and cutting bar with respect to the downward direction of movement of the tubular packaging material.

3. The filling machine as defined in claim 1, wherein said flushing liquid is ozonized water.

4. The filling machine as defined in claim 1, wherein said at least one nozzle includes a plurality of nozzles.

5. The filling machine as defined in claim 1, wherein the flushing liquid is at a temperature of 2° C.–20° C.

6. The filling machine as defined in claim 1, wherein the flushing liquid is at a temperature of 5° C.–15° C.

7. A filling machine for producing containers containing liquid food product comprising:

filling means for filling a liquid food product into a tubular packaging material conveyed downwardly from above, the packaging material having an outside surface;

at least one forming flap engageable with the packaging material to transform and form the packaging material into a desired configuration;

sealing means for sealing the tubular packaging material transversely under a liquid level of the liquid food product in the tubular packaging material to form a transverse seal zone;

cutting means for cutting the seal zone to form a preformed container containing liquid food product; and flushing liquid supplying means for supplying a flushing liquid containing a disinfectant towards at least a portion of the outside surface of the packaging material located above the transverse seal zone, said flushing liquid supplying means being positioned above said at least one forming flap.

8. The filling machine as defined in claim 7, wherein said flushing liquid supplying means includes at least one nozzle.

9. The filling machine as defined in claim 7, wherein said flushing liquid supplying means is positioned upstream of the sealing means and cutting means with respect to the downward direction of movement of the tubular packaging material.

10. The filling machine as defined in claim 7, wherein said flushing liquid is ozonized water.

11. The filling machine as defined in claim 7, wherein said flushing liquid supplying means includes a plurality of nozzles.

12. The filling machine as defined in claim 7, wherein the flushing liquid has a temperature of 2° C.–20° C.

13. A method of producing containers containing liquid food product comprising:

forming a web-shaped packaging material into a tubular packaging material having an outside surface;

introducing a liquid food product into the tubular packaging material while the tubular packaging material is being conveyed downwardly;

pressing at least one forming flap against the tubular packaging material to transform and form the packaging material into a desired configuration;

forming a transverse seal across the tubular packaging material containing the liquid food product;

cutting the tubular packaging material in the transverse seal of the packaging material to form a filled preformed container; and directing a sterilizing flushing liquid towards at least a portion of the outside surface of the tubular packaging material located above the transverse seal and above the at least one forming flap while the tubular packaging material is being cut in the transverse seal of the packaging material.

14. The method according to claim 13, wherein the flushing liquid is directed towards the tubular packaging material by at least one nozzle.

15. The method according to claim 13, wherein the flushing liquid is directed towards the tubular packaging material at a position upstream of where the transverse seal is cut.

16. The method according to claim 13, wherein the flushing liquid is ozonized water.

17. The method according to claim 13, wherein the flushing liquid has a temperature of 2° C.–20° C.

* * * * *

UNITED STATES PATENT AND TRADEMARK OFFICE
CERTIFICATE OF CORRECTION

PATENT NO.   : 6,666,002 B1
DATED        : December 23, 2003
INVENTOR(S)  : Yuzo Otsuka et al.

It is certified that error appears in the above-identified patent and that said Letters Patent is hereby corrected as shown below:

<u>Title page,</u>
Item [22], change "(22) PCT Filed: Jul. 6, 2002" to -- (22) PCT Filed: Jul. 6, 2000 --

Signed and Sealed this

Thirtieth Day of March, 2004

JON W. DUDAS
*Acting Director of the United States Patent and Trademark Office*